US012592493B2

(12) United States Patent
Chi et al.

(10) Patent No.: US 12,592,493 B2
(45) Date of Patent: Mar. 31, 2026

(54) METASURFACE UNIT AND ANTENNA

(71) Applicant: BEIJING XIAOMI MOBILE SOFTWARE CO., LTD., Beijing (CN)

(72) Inventors: Liangang Chi, Beijing (CN); Dong Chen, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 110 days.

(21) Appl. No.: 18/701,136

(22) PCT Filed: Oct. 14, 2021

(86) PCT No.: PCT/CN2021/123850
§ 371 (c)(1),
(2) Date: Apr. 12, 2024

(87) PCT Pub. No.: WO2023/060510
PCT Pub. Date: Apr. 20, 2023

(65) Prior Publication Data

US 2024/0356236 A1 Oct. 24, 2024

(51) Int. Cl.

*H01Q 15/00* (2006.01)
*H01Q 15/24* (2006.01)
*H01Q 21/00* (2006.01)
*H01Q 21/06* (2006.01)

(52) U.S. Cl.

CPC ....... *H01Q 15/0086* (2013.01); *H01Q 15/242* (2013.01); *H01Q 21/0012* (2013.01); *H01Q 21/065* (2013.01)

(58) Field of Classification Search

CPC ............ H01Q 15/0086; H01Q 15/242; H01Q 21/0012; H01Q 21/065; H01Q 21/245; H01Q 21/28
See application file for complete search history.

(56) References Cited

U.S. PATENT DOCUMENTS

2020/0274245 A1* 8/2020 Shrekenhamer ..... H10N 70/882

FOREIGN PATENT DOCUMENTS

CN 107039771 A 8/2017

OTHER PUBLICATIONS

Hongcai Yang et al., "Design of Broadband Circularly Polarized All-Textile Antenna and Its Conformal Array for Wearable Devices", IEEE Transactions On Antennas And Propagation, vol. 70, No. 1, Jan. 2022, 12 pages.

(Continued)

*Primary Examiner* — Daniel Munoz
(74) *Attorney, Agent, or Firm* — Cozen O'Connor

(57) ABSTRACT

A metasurface unit includes a metal radiation patch with a gap, an upper-layer dielectric plate, a metal ground layer, a lower-layer dielectric plate, and a feed structure arranged in sequence from top to bottom. One end of the feed structure is connected to the metal radiation patch, and another end of the feed structure is arranged on a bottom layer of the lower-layer dielectric plate through a feed through hole. The feed through hole passes through the upper-layer dielectric plate, the metal ground layer and the lower-layer dielectric plate in turn. The metal radiation patch is rotatable around a central axis. Different included angles between the gap and a positive direction of an X-axis correspond to different polarization states.

18 Claims, 6 Drawing Sheets

(56) References Cited

OTHER PUBLICATIONS

Weixu Yang et al., "Compact Multibeam Metasurface Lens Antenna with Circular Polarization for 5G Millimeter-Wave Application", 2021 13th Global Symposium On Millimeter-Waves & Terahertz (GSMM), IEEE, May 23, 2021, 3 pages.
European Patent Application No. 21960247.1 Search Report dated Nov. 20, 2024, 10 pages.
PCT/CN2021/123850 International Search Report dated Mar. 28, 2022, 2 pages.

* cited by examiner

METASURFACE UNIT AND ANTENNA

CROSS-REFERENCE TO RELATED APPLICATION

This application is a US national phase application of International Application No. PCT/CN2021/123850, filed on Oct. 14, 2021, the content of which is hereby incorporated by reference in its entirety for all purposes.

TECHNICAL FIELD

The disclosure relates to the field of wireless communication technologies, and in particular, to a metasurface unit and an antenna.

BACKGROUND

In the related art, a Multiple Input Multiple Output (MIMO) antenna is one of the most promising technologies in the field of wireless communication networks, which may greatly increase the capacity of a wireless communication system and improve spectrum utilization. Multiple antennas are deployed in the MIMO antenna system, and the data stream from a single user is divided into several sub-streams and sent out using the multiple antennas, respectively.

SUMMARY

In a first aspect, embodiments of the disclosure provide a metasurface unit. The metasurface unit includes: a metal radiation patch with a gap, an upper-layer dielectric plate, a metal ground layer, a lower-layer dielectric plate, and a feed structure arranged in sequence from top to bottom; one end of the feed structure is connected to the metal radiation patch, and the other end of the feed structure is arranged on a bottom layer of the lower-layer dielectric plate through a feed through hole; the feed through hole passes through the upper-layer dielectric plate, the metal ground layer and the lower-layer dielectric plate in turn; the metal radiation patch is rotatable around a central axis, and different included angles between the gap and a positive direction of an X-axis correspond to different polarization states.

In a second aspect, embodiments of the disclosure provide an antenna. The antenna includes: a metasurface. At least one subarray is arranged on the metasurface, and each subarray corresponds to a respective antenna channel. Each subarray includes a plurality of metasurface units as described in embodiments of the first aspect above, polarization states of the metasurface units are the same or different.

BRIEF DESCRIPTION OF THE DRAWINGS

In order to more clearly illustrate the technical solutions in embodiments of the disclosure or the background art, the following will describe the drawings that need to be used in embodiments of the disclosure or the background art.

DETAILED DESCRIPTION

It is understandable that the communication system is described in embodiments of the disclosure is to illustrate the technical solutions of embodiments of the disclosure more clearly, and does not constitute a limitation on the technical solutions according to embodiments of the disclosure. With the evolution of the system architecture and the emergence of new business scenarios, the technical solutions according to embodiments of the disclosure are also applicable to similar technical problems.

In the related art, Multiple Input Multiple Output (MIMO) antenna is one of the most promising technologies in the current communication field, which may greatly increase the capacity of a wireless communication system and improve spectrum utilization. Multiple antennas are deployed in the MIMO antenna system, and the data stream from a single user is divided into several sub-streams and sent out respectively.

In the above solution, a crosstalk between the sub-streams is relatively large, and the transmission efficiency of the data stream is poor.

The metasurface unit and antenna according to disclosure will be described in detail below with reference to the accompanying drawings. Before specifically describing embodiments of the disclosure, the metasurface is firstly introduced for ease of understanding.

The metasurface is a two-dimensional metamaterial. The metamaterial is an artificially structured material composed of periodically arranged subwavelength units. The appearance of the metamaterial brings many physical phenomena that do not exist in nature, such as inverse Doppler, negative refraction, inverse Cerenkov radiation, etc. Compared with ordinary metamaterials, the metasurface has advantages of low profile and easy integration. The metasurface utilizes abrupt amplitude and phase changes obtained when the electromagnetic wave reaches the surface of the metasurface unit to manipulate the electromagnetic wave, thereby realizing functions such as polarization conversion, holographic imaging, wave absorption, and anomalous refraction. The concept of "digital metasurface" expresses the state of a unit of the metasurface with a finite number of binary numerals. Taking 1-bit digital metasurface as an example, an initial state is represented by "0", and a state with a phase difference of 180° from the initial state is represented by "1". That is, the discretized phase states correspond to the digital information one by one, and the control of the scattering and deflection of the electromagnetic wave is realized by changing the coding state. The more bits used to digitally encode the metasurface, the more precise the manipulation of electromagnetic wave.

Figure 1:
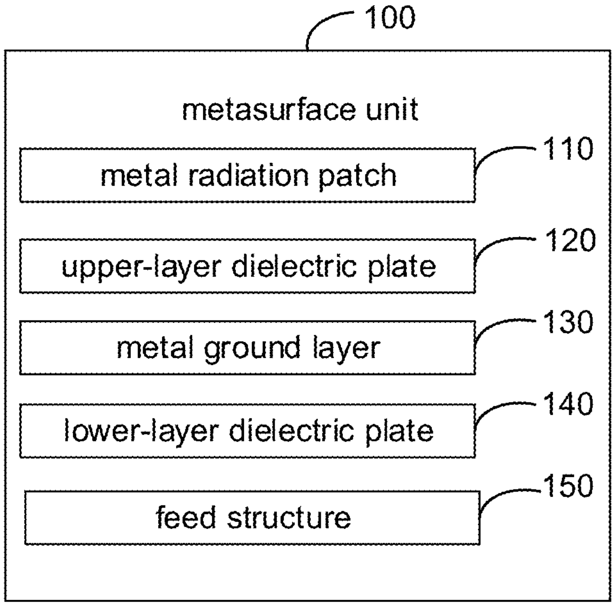
FIG. 1 is a schematic structural diagram illustrating a metasurface unit according to an embodiment of the disclosure.

FIG. 1 is a schematic structural diagram illustrating a metasurface unit according to an embodiment of the disclosure. As illustrated in FIG. 1, the metasurface unit 100 includes: a metal radiation patch 110 with a gap, an upper-layer dielectric plate 120, a metal ground layer 130, a lower-layer dielectric plate 140, and a feed structure 150 arranged in sequence from top to bottom.

One end of the feed structure 150 is connected to the metal radiation patch to feed power, and the other end of the feed structure 150 is arranged on a bottom layer of the lower-layer dielectric plate 140 through a feed through hole. The feed through hole passes through the upper-layer dielectric plate 120, the metal ground layer 130 and the lower-layer dielectric plate 140 in turn. The metal radiation patch 110 is rotatable around a central axis. Different included angles between the gap and a positive direction of an X-axis correspond to different polarization states. It is noteworthy that a central axis of the feed through hole is consistent with a central axis of the metal radiation patch.

In embodiments of the disclosure, the metal radiation patch may include a metal ring with the gap, and a metal wire connected to the metal ring. One end of the feed structure is connected to the metal wire. A connection point between the metal wire and the metal ring is at a non-notch portion of the metal ring.

As a possible implementation of embodiments of the disclosure, an included angle between the metal wire and a negative direction of a Y-axis is a specified angle. For example, the included angle between the metal wire and the negative direction of the Y-axis is β, and β=45°.

In embodiments of the disclosure, the metal radiation patch 110 is rotatable around the central axis. As the metal radiation patch rotates around the central axis, the included angle between the gap and the positive direction of the X-axis varies, and different included angles between the gap and the positive direction of the X-axis correspond to different polarization states of the metasurface unit. The included angle between the gap and the positive direction of the X-axis is at least one of: 0 degree, 45 degree, 65 degree or 90 degree.

Figure 2A:
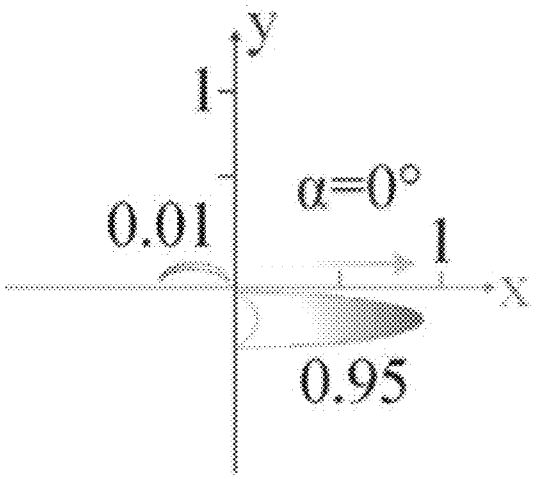
FIG. 2A is a schematic diagram illustrating a polarization state of a metasurface unit at $\alpha=0°$ according to an embodiment of the disclosure.
Figure 2B:
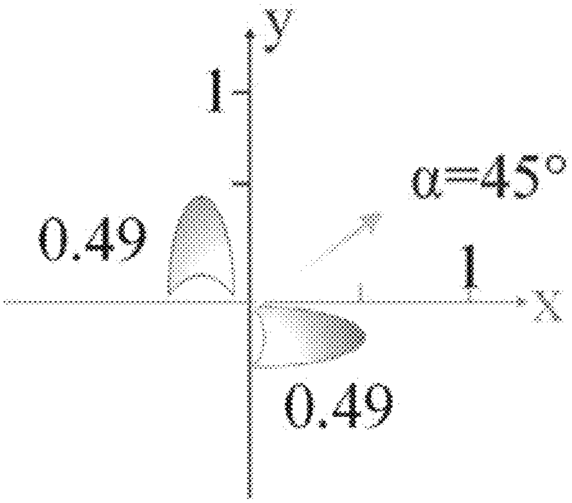
FIG. 2B is a schematic diagram illustrating a polarization state of a metasurface unit at $\alpha=45°$ according to an embodiment of the disclosure.
Figure 2C:
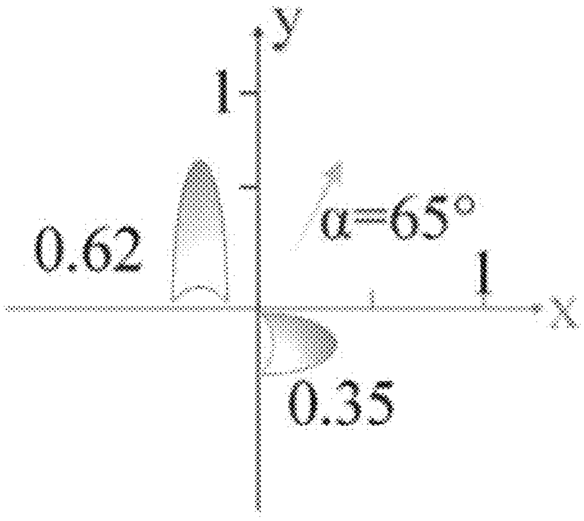
FIG. 2C is a schematic diagram illustrating a polarization state of a metasurface unit at $\alpha=65°$ according to an embodiment of the disclosure.
Figure 2D:
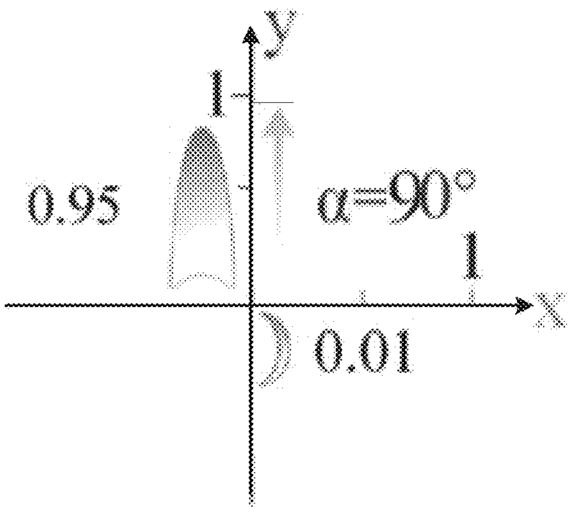
FIG. 2D is a schematic diagram illustrating a polarization state of a metasurface unit at $\alpha=90°$ according to an embodiment of the disclosure.

For example, as illustrated in FIG. 2A, FIG. 2B, FIG. 2C and FIG. 2D, FIG. 2A illustrates that an included angle between the gap and the positive direction of the X-axis is α=0°; FIG. 2B illustrates that an included angle between the gap and the positive direction of the X-axis is α=45°; FIG. 2C illustrates that an included angle between the gap and the positive direction of the X-axis is α=65°; and FIG. 2D illustrates that an included angle between the gap and the positive direction of the X-axis is α=90°. Different included angles α between gaps and the positive direction of the X-axis corresponds to different polarization states of the metasurface unit.

In an embodiment of the disclosure, in order to separate the feed structure 150 from the metal ground layer 130, the radius of the feed through hole may be larger than the radius of the feed structure.

Figure 3:
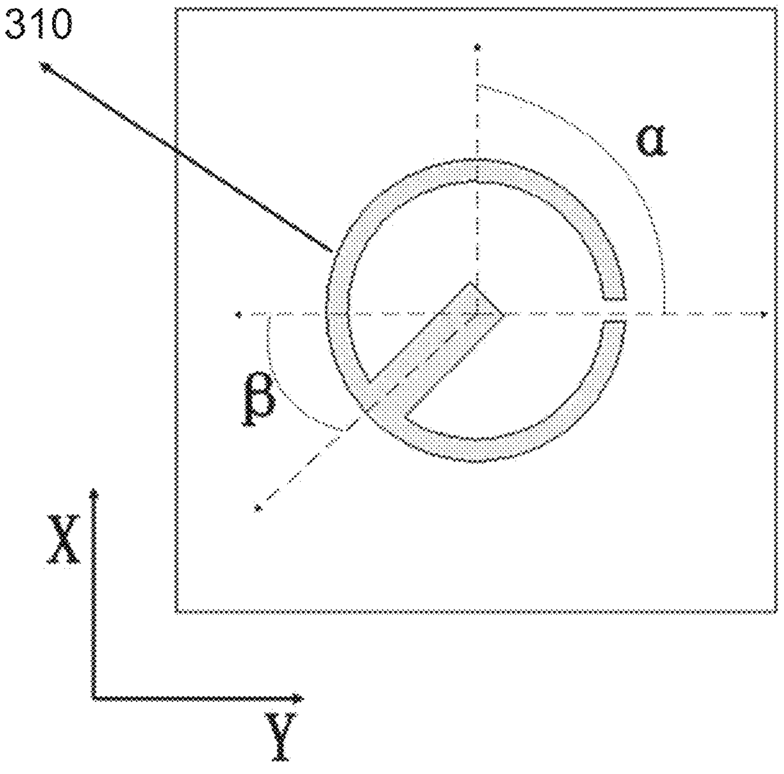
FIG. 3 is a schematic top view of a metasurface unit corresponding to embodiments of FIG. 1 according to an embodiment of the disclosure.

In order to illustrate the above-mentioned embodiments more clearly, the disclosure further provides a schematic top view of a metasurface unit, as illustrated in FIG. 3. FIG. 3 is a schematic top view of a metasurface unit corresponding to embodiments of FIG. 1 according to an embodiment of the disclosure. Due to occlusion, only the metal radiation patch 310 with a gap is seen in FIG. 3. The metal radiation patch 310 in FIG. 3 has the same structure and function as the metal radiation patch 110 in FIG. 1. In FIG. 3, β represents an included angle between the metal wire and the negative direction of the Y-axis, and a represents the included angle between the gap and the positive direction of the X-axis.

Figure 4:
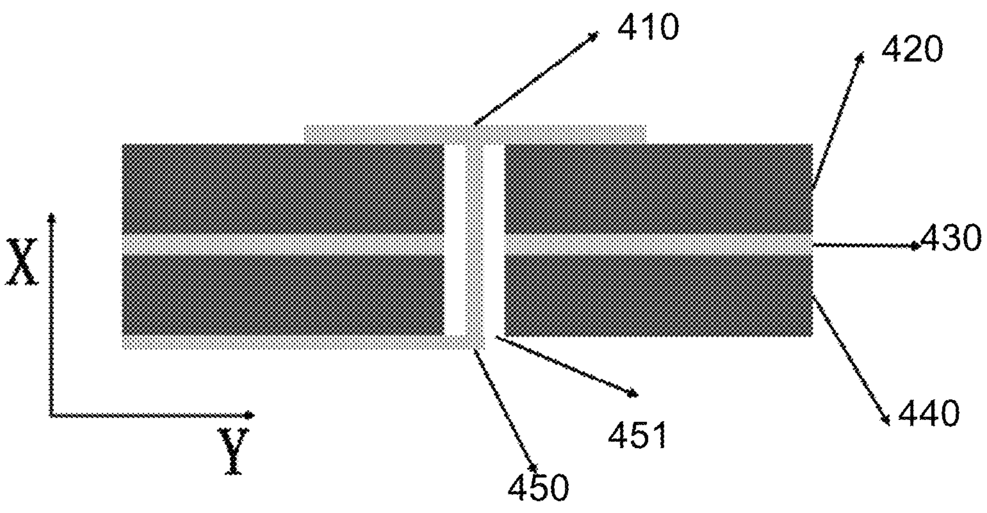
FIG. 4 is a schematic side view of a metasurface unit corresponding to embodiments of FIG. 1 according to an embodiment of the disclosure.

The disclosure is described above by taking the schematic top view of a metasurface unit as an example. The disclosure further provides a schematic side view of a metasurface unit. FIG. 4 is a schematic side view of a metasurface unit corresponding to embodiments of FIG. 1 according to an embodiment of the disclosure. The metasurface unit 400 includes: a metal radiation patch 410 with a gap, an upper-layer dielectric plate 420, a metal ground layer 430, a lower-layer dielectric plate 440, and a feed structure 450 arranged in order from top to bottom. FIG. 4 also illustrates a feed through hole 451. The structures and functions of each component in FIG. 4 are the same as those of the corresponding component in FIG. 1. The function of each component in FIG. 4 may refer to the explanation of any of above-mentioned embodiments, which is not repeated herein.

With the metasurface unit according to embodiments of the disclosure, by manipulating the included angle between the gap of the metal radiation patch and the positive direction of the X-axis, the metasurface unit with different polarization states may be obtained. Further, different subarrays of a metasurface-based antenna may directly have a polarization isolation relationship with each other, such that the crosstalk between sub-streams is reduced and the efficiency of data stream transmission is improved.

Figure 5:
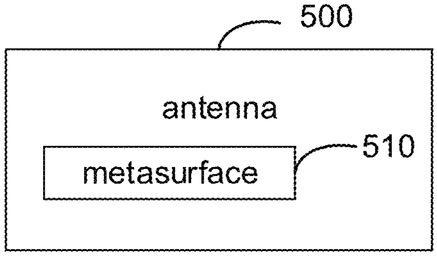
FIG. 5 is a schematic diagram illustrating an antenna according to an embodiment of the disclosure.

Embodiments of the disclosure further provide an antenna. FIG. 5 is a schematic diagram illustrating an antenna according to an embodiment of the disclosure.

As illustrated in FIG. 5, the antenna 500 includes: a metasurface 510.

The metasurface 510 is provided with at least one subarray, and each subarray corresponds to a respective antenna channel. The subarray includes a plurality of metasurface units as described in embodiments of FIG. 1 to FIG. 4. The polarization states of a plurality of metasurface units are the same or different.

In embodiments of the disclosure, each metasurface unit may include: a metal radiation patch with a gap, an upper-layer dielectric plate, a metal ground layer, a lower-layer dielectric plate, and a feed structure arranged in order from top to bottom. The metal radiation patch is rotatable around a central axis. Different included angles between the gap and the positive direction of the X-axis correspond to different polarization states of the metasurface unit. The polarization states of the multiple metasurface units in the antenna 500 may be same or different.

Further, at least one metasurface unit is formed into one or more subarrays. For each subarray, the number of metasurface units in each row of the subarray is consistent with the number of metasurface units in each column of the subarray. The number of subarrays in each row of the metasurface is consistent with the number of subarrays in each column of the metasurface. For example, m×m subarrays may be set on the metasurface, and each subarray may include n×n metasurface units.

Figure 6:
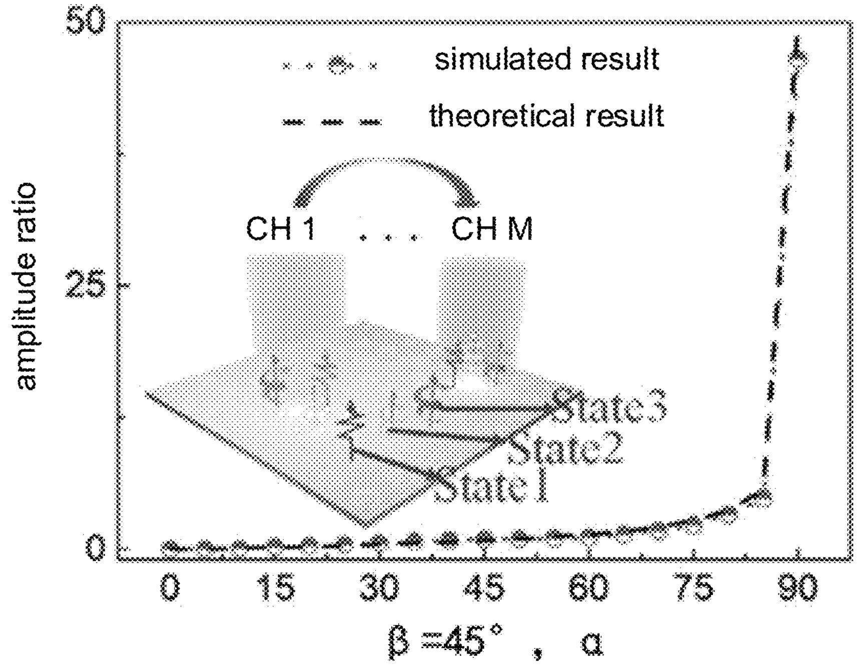
FIG. 6 is a schematic diagram illustrating a metasurface-based subarray according to an embodiment of the disclosure.

In embodiments of the disclosure, at least one subarray may be set on the metasurface based on the number of users, and each subarray may correspond to a respective antenna channel. That is, there are multiple transmitting antennas and multiple receiving antennas. In embodiments of the disclosure, each metasurface may be used as a small Multiple Input Multiple Output (MIMO) system. For example, as illustrated in FIG. 6, multiple subarrays, such as subarray 1 to subarray M, are set on the metasurface, each subarray corresponds to a respective channel, and multiple subarrays such as subarray 1 to subarray M correspond to channel 1 to channel M. Different channels correspond to different polarization states, such as State1, State2, and State3.

In embodiments of the disclosure, since each subarray is composed of several metasurface units with different polarization modes, the arrangement of the metasurface units is different per subarray. Further, the polarization states of the metasurface units are different per subarray. The arrangement of the metasurface units in the subarray represents the arrangement of the polarization states of the metasurface units in the subarray.

In order to enhance the confidentiality of the communication system, for each subarray in the metasurface, the subarray forms an interactive channel with a target subarray in a metasurface of a communication counterpart. The arrangement of the metasurface units of the target subarray is in a transposition relationship with the arrangement of the metasurface units of the subarray. For example, when the arrangement of the metasurface units of the target subarray at the receiving end is in the transposition relationship with the arrangement of the metasurface units of the subarray at the transmitting end, the receiving end may effectively receive the electromagnetic waves emitted by the transmitting end. When the arrangement of the metasurface units of target subarray at the transmitter end does not in the transposition relationship with the arrangement of the metasurface units of the subarray at the receiving end, the electromagnetic waves emitted by the transmitter cannot be effectively received.

Figure 7:
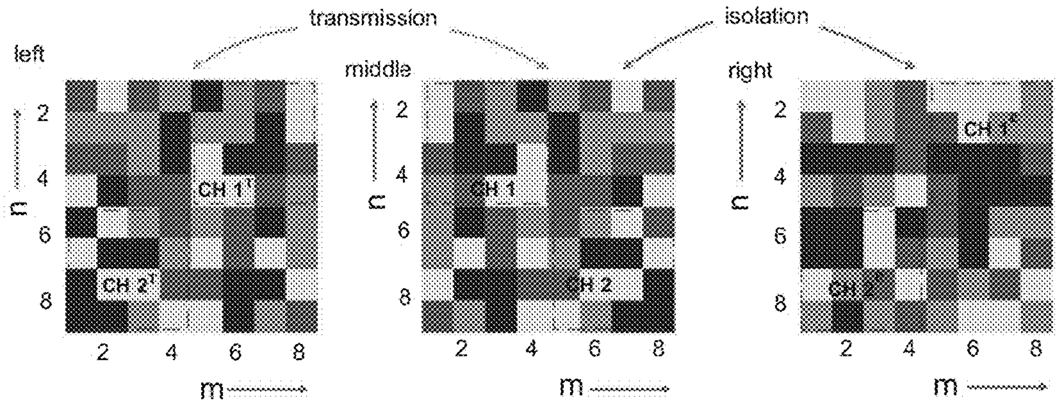
FIG. 7 is a schematic diagram illustrating metasurface-based sub-arrays with different arrangements according to an embodiment of the disclosure.

For example, as illustrated in FIG. 7, each subarray corresponds to a respective antenna channel, and each subarray includes a plurality of metasurface units. In FIG. 7, blocks of different colors represent the metasurface units with different polarization modes. The arrangement of the metasurface units corresponding to the channel 1 in the middle part is in the transposition relationship with the arrangement of the metasurface units corresponding to the channel $\mathbf{1}^T$ in the left part of FIG. 7. These two channels may communicate with each other. That is, these two channels may effectively receive electromagnetic waves from each other. The arrangement of the metasurface units corresponding to the channel 1 is not in the transposition relationship with the arrangement of the metasurface units corresponding to any of the channel $\mathbf{2}^T$, channel 2, channel $\mathbf{2}^e$ or channel $\mathbf{1}^e$, and thus the channel 1 cannot communication with these channels.

Figure 8:
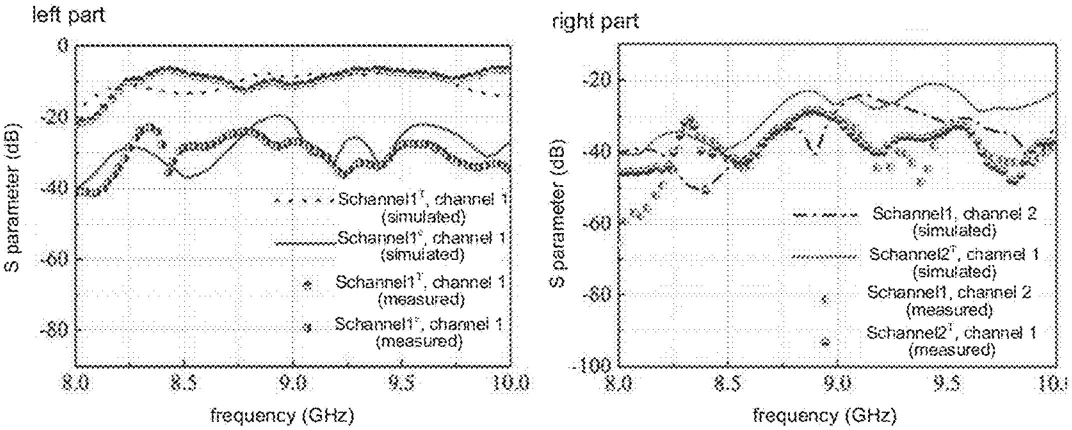
FIG. 8 is a schematic diagram illustrating a numerical simulation of transmission coefficients between different sub-arrays and a microwave anechoic chamber measurement curve according to an embodiment of the disclosure.

Further, as illustrated in FIG. 8, the left part of FIG. 8 is the numerical simulation and microwave anechoic chamber measurement results of the transmission coefficient between the channel 1 and the channel $\mathbf{1}^T$, as well as between the channel 1 and the channel $\mathbf{1}^c$, and the right part of FIG. 8 is the numerical simulation and microwave anechoic chamber measurement results of the transmission coefficient between the channel 1 and the channel 2, as well as between the channel 1 and the channel $\mathbf{2}^T$. In the 8 GHz to 10 GHz frequency band, the value of the transmission coefficient between the channel 1 and the channel 1T is greater than −20 dB, which means that information may be transmitted therebetween; the value of the transmission coefficient between the channel 1 and the channel 1*e* is less than −20 dB, which means that the information cannot be effectively transmitted therebetween; the values of the transmission coefficient between the channel 1 and the channel 2 as well as between the channel 1 and the channel $\mathbf{2}^T$ are both less than −20 dB, which means that the information cannot be effectively transmitted therebetween. Therefore, information can only be effectively transmitted when the arrangements of the metasurface units satisfy the transposition relationship, that is, when the polarizations of the sub-arrays matches with each other.

Figure 9A:
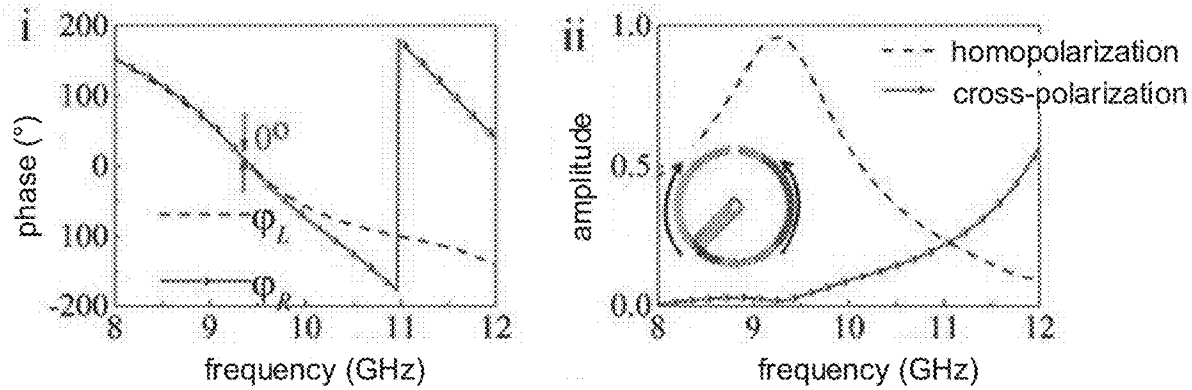
FIG. 9A is a schematic diagram illustrating a simulated curve of radiation phase and amplitude at $\alpha=0°$ according to an embodiment of the disclosure.
Figure 9B:
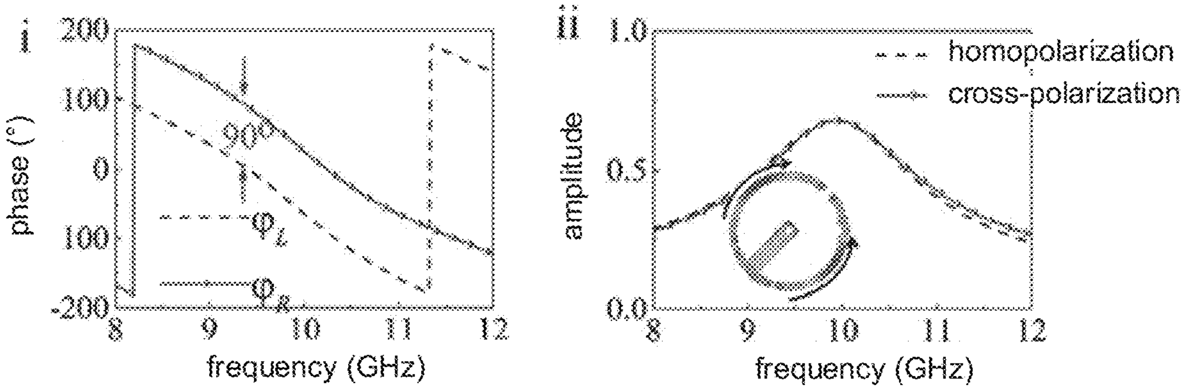
FIG. 9B is a schematic diagram illustrating a simulated curve of radiation phase and amplitude at $\alpha=45°$ according to an embodiment of the disclosure.
Figure 9C:
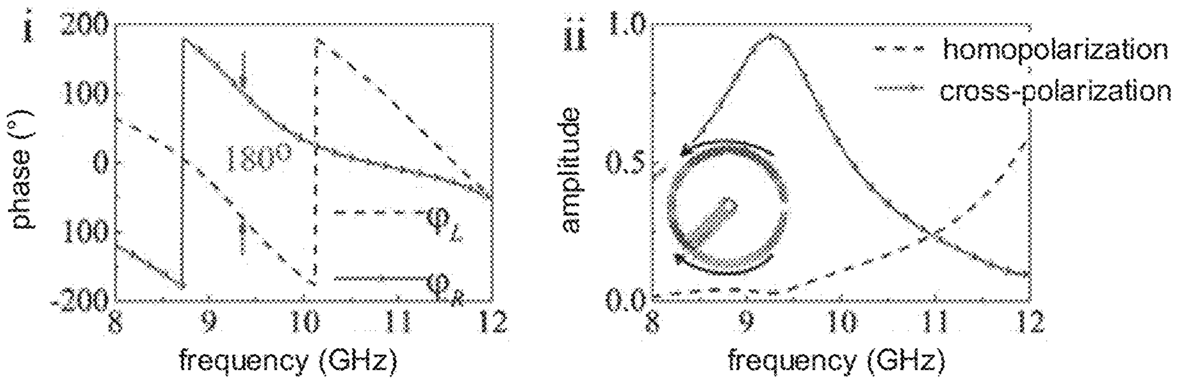
FIG. 9C is a schematic diagram illustrating a simulated curve of radiation phase and amplitude at $\alpha=90°$ according to an embodiment of the disclosure.

It is noteworthy that the metasurface utilizes the abrupt amplitude and phase changes obtained when the electromagnetic wave reaches the surface of the metasurface unit to manipulate the electromagnetic wave, which may realize polarization conversion, holographic imaging, wave absorption, anomalous refraction and other functions. The abrupt amplitude and phase changes obtained when the electromagnetic wave reaches the surface of the metasurface unit are illustrated in FIG. 9A, FIG. 9B and FIG. 9C, which illustrate the simulation curves of radiation phase and amplitude when the included angles between the gap of the metal radiation patch of the metasurface unit and the positive direction of the X axis is at $\alpha=0°$, $\alpha=45°$ and $\alpha=90°$ respectively.

With the metasurface-based antenna according to embodiments of the disclosure, at least one subarray is arranged on the metasurface, and each subarray corresponds to a respective antenna channel. The subarray includes a plurality of metasurface units, and the polarization states of the plurality of metasurface units are the same or different. By manipulating the included angle between the gap of the metal radiation patch of the metasurface unit in the metasurface and the positive direction of the X axis, the metasurface unit with different polarization states may be obtained. Therefore, different subarrays of the metasurface-based antenna may directly have a polarization isolation relationship with each other, such that the crosstalk between sub-streams is reduced and the efficiency of data stream transmission is improved.

In the technical solution, by manipulating the included angle between the gap of the metal radiation patch and the positive direction of the X-axis, the metasurface unit with different polarization states may be obtained. Further, different subarrays of a metasurface-based antenna may directly have a polarization isolation relationship with each other, such that the crosstalk between sub-streams is reduced and the efficiency of data stream transmission is improved.

Those of ordinary skill in the art may understand that the "first," "second," and other numbers involved in the disclosure are only for convenience of description, but are not used to limit the scope of embodiments of the disclosure. Further, the numbers also indicate the sequence.

The term "at least one" in the disclosure may also be described as "one or a plurality of", and the term "a plurality of" may be two, three, four or more, which is not limited in the disclosure. In embodiments of the disclosure, for a technical feature, the technical feature is distinguished using "first," "second," "third," "A," "B," "C," "D," etc. The technical features defined using the "first," "second," "third," "A," "B," "C," or "D" have no sequence or order of magnitude among the technical features.

The correspondence shown in each table in the disclosure may be configured or predefined. The values of the information in each table are just examples and may be configured as other values, which are not limited in the disclosure. When configuring the correspondence between the information and each parameter, it is not necessarily required to configure all the correspondences shown in the tables. As an example, in the table in the disclosure, the correspondences shown in some rows may not be configured. As another example, appropriate deformation adjustments may be made to the above table, such as splitting, merging, and so on. The parameters shown in the titles of the above tables may also adopt other names understandable by the communication device, and the parameters may also be other values or representations understandable by the communication device. When the above tables are implemented, other data structures may also be used. For example, arrays, queues, containers, stacks, linear tables, pointers, linked lists, trees, graphs, structures, classes, heaps, hash tables or hash tables may be used.

Predefinition in the disclosure may be understood as definition, predefinition, storage, pre-storage, pre-negotiation, pre-configuration, curing, or pre-firing.

Those skilled in the art may appreciate that the units and algorithm steps of the examples described in conjunction with embodiments disclosed herein may be implemented by electronic hardware, or a combination of computer software and electronic hardware. Whether these functions are executed by hardware or software depends on the specific application and design constraints of the technical solution. Those skilled may implement the described functionality using different methods for each particular application, but such implementation should not be considered beyond the scope of the present disclosure.

Those skilled in the art may clearly understand that for the convenience and brevity of the description, the specific working process of the above-described system, device and unit may refer to the corresponding process in the foregoing method embodiments, which will not be repeated here.

The above is only a specific implementation of the disclosure, but the scope of protection of the disclosure is not limited thereto. Those skilled in the art may easily think of changes or substitutions within the technical scope of the disclosure, which should fall within the protection scope of the disclosure. Therefore, the protection scope of the disclosure should be determined by the protection scope of the claims.

What is claimed is:

1. A metasurface unit, comprising:

a metal radiation patch with a gap, an upper-layer dielectric plate, a metal ground layer, a lower-layer dielectric plate, and a feed structure arranged in sequence from top to bottom;

wherein one end of the feed structure is connected to the metal radiation patch, and another end of the feed structure is arranged on a bottom layer of the lower-layer dielectric plate through a feed through hole; the feed through hole passes through the upper-layer dielectric plate, the metal ground layer and the lower-layer dielectric plate in turn;

the metal radiation patch is rotatable around a central axis, and different included angles between the gap and a positive direction of an X-axis correspond to different polarization states;

wherein a central axis of the feed through hole is consistent with a central axis of the metal radiation patch.

2. The metasurface unit of claim 1, wherein the metal radiation patch includes a metal ring with the gap and a metal wire connected to the metal ring;

wherein the one end of the feed structure is connected to the metal wire.

3. The metasurface unit of claim 2, wherein a connection point between the metal wire and the metal ring is at a non-gap portion of the metal ring.

4. The metasurface unit of claim 3, wherein an included angle between the metal wire and a negative direction of a Y-axis is a specified angle.

5. The metasurface unit of claim 2, wherein an included angle between the metal wire and a negative direction of a Y-axis is a specified angle.

6. The metasurface unit of claim 1, wherein a value of the included angle between the gap and the positive direction of the X-axis is at least one of: 0 degree, 45 degree, 65 degree or 90 degree.

7. The metasurface unit of claim 1, wherein a radius of the feed through hole is greater than a radius of the feed structure.

8. An antenna, comprising:

a metasurface, wherein at least one subarray is arranged on the metasurface, and each subarray corresponds to a respective antenna channel;

each subarray includes a plurality of metasurface units, and polarization states of the metasurface units are the same or different;

wherein each metasurface unit comprises:

a metal radiation patch with a gap, an upper-layer dielectric plate, a metal ground layer, a lower-layer dielectric plate, and a feed structure arranged in sequence from top to bottom;

wherein one end of the feed structure is connected to the metal radiation patch, and another end of the feed structure is arranged on a bottom layer of the lower-layer dielectric plate through a feed through hole; the feed through hole passes through the upper-layer dielectric plate, the metal ground layer and the lower-layer dielectric plate in turn;

the metal radiation patch is rotatable around a central axis, and different included angles between the gap and a positive direction of an X-axis correspond to different polarization states;

wherein a central axis of the feed through hole is consistent with a central axis of the metal radiation patch.

9. The antenna of claim 8, wherein a number of metasurface units in each row of the subarray is same as a number of metasurface units in each column of the subarray.

10. The antenna of claim 9, wherein a number of subarrays in each row of the metasurface is same as a number of subarrays in each column of the metasurface.

11. The antenna of claim 8, wherein a number of subarrays in each row of the metasurface is same as a number of subarrays in each column of the metasurface.

12. The antenna of claim 8, wherein the metasurface units are arranged in different ways per subarray, an arrangement of the metasurface units of a subarray represents an arrangement of polarization states of the metasurface units of the subarray.

13. The antenna of claim 12, wherein for each subarray in the metasurface, an interactive channel is formed between the subarray and a target subarray in the metasurface of a communication counterpart; and an arrangement of the metasurface units of the target subarray is in a transposition relationship with the arrangement of the metasurface units of the subarray.

14. The antenna of claim 8, wherein the metal radiation patch includes a metal ring with the gap and a metal wire connected to the metal ring;

wherein the one end of the feed structure is connected to the metal wire.

15. The antenna of claim 14, wherein a connection point between the metal wire and the metal ring is at a non-gap portion of the metal ring.

16. The antenna of claim 14, wherein an included angle between the metal wire and a negative direction of a Y-axis is a specified angle.

17. The antenna of claim 8, wherein a value of the included angle between the gap and the positive direction of the X-axis is at least one of: 0 degree, 45 degree, 65 degree or 90 degree.

18. The antenna of claim 8, wherein a radius of the feed through hole is greater than a radius of the feed structure.

* * * * *